(12) United States Patent
Enomoto et al.

(10) Patent No.: US 11,560,937 B2
(45) Date of Patent: Jan. 24, 2023

(54) TRANSMISSION

(71) Applicant: UNIVANCE CORPORATION, Kosai (JP)

(72) Inventors: Hirokazu Enomoto, Kosai (JP); Hajime Suzuki, Kosai (JP)

(73) Assignee: UNIVANCE CORPORATION, Kosai (JP)

( * ) Notice: Subject to any disclaimer, the term of this patent is extended or adjusted under 35 U.S.C. 154(b) by 0 days.

(21) Appl. No.: 17/270,093

(22) PCT Filed: Aug. 23, 2018

(86) PCT No.: PCT/JP2018/031059
§ 371 (c)(1),
(2) Date: Feb. 22, 2021

(87) PCT Pub. No.: WO2020/039529
PCT Pub. Date: Feb. 27, 2020

(65) Prior Publication Data
US 2021/0239189 A1 Aug. 5, 2021

(51) Int. Cl.
*F16H 3/093* (2006.01)
*B60K 25/00* (2006.01)

(52) U.S. Cl.
CPC ............. *F16H 3/093* (2013.01); *B60K 25/00* (2013.01); *B60Y 2200/22* (2013.01); *B60Y 2200/221* (2013.01); *F16H 2200/0004* (2013.01); *F16H 2200/0078* (2013.01); *F16H 2200/0082* (2013.01)

(58) Field of Classification Search
CPC ......... F16H 3/093; B60K 25/00; B60K 25/06; B60Y 2200/22; B60Y 2200/221
See application file for complete search history.

(56) References Cited

U.S. PATENT DOCUMENTS 5,063,793 A * 11/1991 McAskill ................ F16H 3/093
74/331
7,421,920 B2 * 9/2008 Regenscheit ........... F16H 3/093
74/665 F
2013/0047760 A1 2/2013 Ohmori

FOREIGN PATENT DOCUMENTS

CN 102966727 A 3/2013
JP 2010-285062 A 12/2010
(Continued)

OTHER PUBLICATIONS

Written Opinion dated Nov. 20, 2018, issued in counterpart International Application No. PCT/JP2018/031059 (6 pages).
(Continued)

*Primary Examiner* — William C Joyce
(74) *Attorney, Agent, or Firm* — WHDA, LLP (57) ABSTRACT

The transmission includes a first shaft, a second shaft, a third shaft, and a fourth shaft. These shafts are parallel to each other. A first gear couples to the first shaft. A second gear couples to or idles around the first shaft when a first clutch is switched. A third gear meshes with the first gear and couples to the second shaft. A fourth gear couples to or idles around the second shaft when a second clutch is switched. A sixth gear meshes with the first gear and couples to the third shaft. A seventh gear couples to or idles around the third shaft when a fourth clutch is switched. A ninth gear meshes with the second gear, the fourth gear, and the seventh gear, and couples to the fourth shaft.

4 Claims, 5 Drawing Sheets

(56) References Cited

FOREIGN PATENT DOCUMENTS

| | | |
|---|---|---|
| JP | 2011-252558 A | 12/2011 |
| JP | 2013-50165 A | 3/2013 |
| JP | 2014-70729 A | 4/2014 |
| WO | 02/097301 A1 | 12/2002 |
| WO | 2018/066120 A1 | 4/2018 |

OTHER PUBLICATIONS

International Search Report dated Nov. 20, 2018, issued in counterpad International Application No. PCT/JP2018/031059 (1 page).
Written Opinion in Japanese dated Nov. 20, 2018, issued in counterpart International Application No. PCT/JP2018/031059 (4 pages).
Extended (Supplementary)European Search Report dated Mar. 14, 2022, issued in counterpart EP Application No. 18930755.6. (11 pages).
Office Action dated May 17, 2022, issued in counterpart JP Application No. 2020-537945, with English Translation. (8 pages).

\* cited by examiner

| Position | Clutch | | | | | | | | | | |
|---|---|---|---|---|---|---|---|---|---|---|---|
| | 1 | 2 | 3 | 4 | 5 | 6 | 7 | 8 | 9 | 10 | 11 |
| F1  |   | × |   |   |   | × |   |   |   | × |   |
| F2  |   |   | × |   |   | × |   |   |   | × |   |
| F3  |   |   |   | × |   | × |   |   |   | × |   |
| F4  |   |   |   |   | × | × |   |   |   | × |   |
| F5  |   | × |   |   |   |   |   |   | × | × |   |
| F6  |   |   | × |   |   |   |   |   | × | × |   |
| F7  |   |   |   | × |   |   |   |   | × | × |   |
| F8  |   |   |   |   | × |   |   |   | × | × |   |
| F9  |   | × |   |   |   |   |   |   |   | × | × |
| F10 |   |   | × |   |   |   |   |   |   | × | × |
| F11 |   |   |   | × |   |   |   |   |   | × | × |
| F12 |   |   |   |   | × |   |   |   |   | × | × |
| F13 |   | × |   |   |   |   | × |   |   | × |   |
| F14 |   |   | × |   |   |   | × |   |   | × |   |
| F15 |   |   |   | × |   |   | × |   |   | × |   |
| F16 |   |   |   |   | × |   | × |   |   | × |   |
| F17 |   | × |   |   |   | × |   |   |   |   | × |
| F18 |   |   | × |   |   | × |   |   |   |   | × |
| F19 |   |   |   | × |   | × |   |   |   |   | × |
| F20 |   |   |   |   | × | × |   |   |   |   | × |
| F21 |   | × |   |   |   |   |   | × |   |   | × |
| F22 |   |   | × |   |   |   |   | × |   |   | × |
| F23 |   |   |   | × |   |   |   | × |   |   | × |
| F24 |   |   |   |   | × |   |   | × |   |   | × |
| F25 |   | × |   |   |   |   |   |   | × |   | × |
| F26 |   |   | × |   |   |   |   |   | × |   | × |
| F27 |   |   |   | × |   |   |   |   | × |   | × |
| F28 |   |   |   |   | × |   |   |   | × |   | × |
| F29 |   | × |   |   |   |   | × |   |   |   | × |
| F30 |   |   | × |   |   |   | × |   |   |   | × |
| F31 |   |   |   | × |   |   | × |   |   |   | × |
| F32 |   |   |   |   | × |   | × |   |   |   | × |
| R1  | × |   |   |   |   | × |   |   |   | × |   |
| R2  | × |   |   |   |   |   |   | × |   | × |   |
| R3  | × |   |   |   |   |   |   |   | × | × |   |
| R4  | × |   |   |   |   |   | × |   |   | × |   |
| R5  | × |   |   |   |   | × |   |   |   |   | × |
| R6  | × |   |   |   |   |   |   | × |   |   | × |
| R7  | × |   |   |   |   |   |   |   | × |   | × |
| R8  | × |   |   |   |   |   | × |   |   |   | × |

TRANSMISSION

TECHNICAL FIELD

The present invention relates to a transmission and, more particularly, to a transmission used in a tractor or other work machine, such as an agricultural machine or a construction machine.

BACKGROUND ART

Disclosed in Patent Literature 1 and Patent Literature 2 is a transmission designed for use in a tractor or other work machine such as an agricultural machine or a construction machine. The transmission includes a first shaft, a second shaft, and a third shaft. Disposed on the first shaft are three gears connected and disconnected by three clutches and one gear coupling to the first shaft. Disposed on the second shaft are three gears connected and disconnected by two clutches and one gear coupling to the second shaft. Disposed on the third shaft are three gears coupling to the third shaft. The gears disposed on the individual shafts constantly mesh with each other, and gear ratios are selected by switching the clutches.

CITATION LIST

Patent Literature

Patent Literature 1: Japanese Unexamined Patent Application Publication No. 2011-252558
Patent Literature 2: International Publication WO 2018/066120

SUMMARY OF INVENTION

Technical Problems

However, according to the technologies disclosed in Patent Literature 1 and Patent Literature 2, three clutches are disposed on the first shaft while no clutch is disposed on the third shaft. Therefore, the first shaft is increased in length. This causes a problem where the transmission requires an increased space.

The present invention has been made to solve the above problems, and has an object to provide a transmission capable of achieving space saving.

Solution to Problems

In accomplishing the above object, a transmission according to the present invention includes at least a first shaft, a second shaft, a third shaft, and a fourth shaft. These shafts are parallel to each other. The first shaft includes a first gear and a second gear. The first gear couples to the first shaft. The second gear couples to or idles around the first shaft when a first clutch is switched. The second shaft includes a third gear and a fourth gear. The third gear meshes with the first gear and couples to the second shaft. The fourth gear couples to or idles around the second shaft when a second clutch is switched. The third shaft includes a sixth gear and a seventh gear. The sixth gear meshes with the first gear and couples to the third shaft. The seventh gear couples to or idles around the third shaft when a fourth clutch is switched. The fourth shaft includes a ninth gear. The ninth gear meshes with the second gear, the fourth gear, and the seventh gear, and couples to the fourth shaft.

Advantageous Effects of Invention

According to the transmission defined in a first claim of the present invention, power of the first shaft is transmitted to the second shaft in order from the first gear to the third gear, and simultaneously transmitted to the third shaft in order from the first gear to the sixth gear. When the first clutch is engaged, the power of the first shaft is transmitted to the fourth shaft in order from the second gear to the ninth gear. Power of the second shaft is transmitted to the fourth shaft in order from the fourth gear to the ninth gear when the second clutch is engaged. Power of the third shaft is transmitted to the fourth shaft in order from the seventh gear to the ninth gear when the fourth clutch is engaged. Disposing clutches on the first to third shafts makes it possible to prevent each shaft from becoming excessively long. This results in space saving.

According to the transmission defined in a second claim of the present invention, the power of the second shaft is transmitted to the fourth shaft in order from a fifth gear to a tenth gear when a third clutch is engaged. The power of the third shaft is transmitted to the fourth shaft in order from an eighth gear to the tenth gear when a fifth clutch is engaged. This increases the number of paths of power transmission to the fourth shaft. Consequently, in addition to the advantageous effect provided by the first claim, it is possible to further increase the number of transmission speeds.

According to the transmission defined in a third claim of the present invention, a fifth shaft parallel to the fourth shaft is additionally included. Power of the fourth shaft is transmitted to the fifth shaft in order from a twelfth gear to a fourteenth gear when a sixth clutch is engaged, and transmitted to the fifth shaft in order from an eleventh gear to an eighteenth gear when an eighth clutch is engaged. This increases the number of paths of power transmission from the fourth shaft to the fifth shaft. Consequently, in addition to the advantageous effect provided by the first or second claim, it is possible to further increase the number of transmission speeds.

According to the transmission defined in a fourth claim of the present invention, the second shaft and the third shaft drive respective hydraulic pumps. Consequently, in addition to the advantageous effect provided by the first, second, or third claim, it is possible to drive many hydraulic pumps.

DESCRIPTION OF EMBODIMENTS

Figure 1:
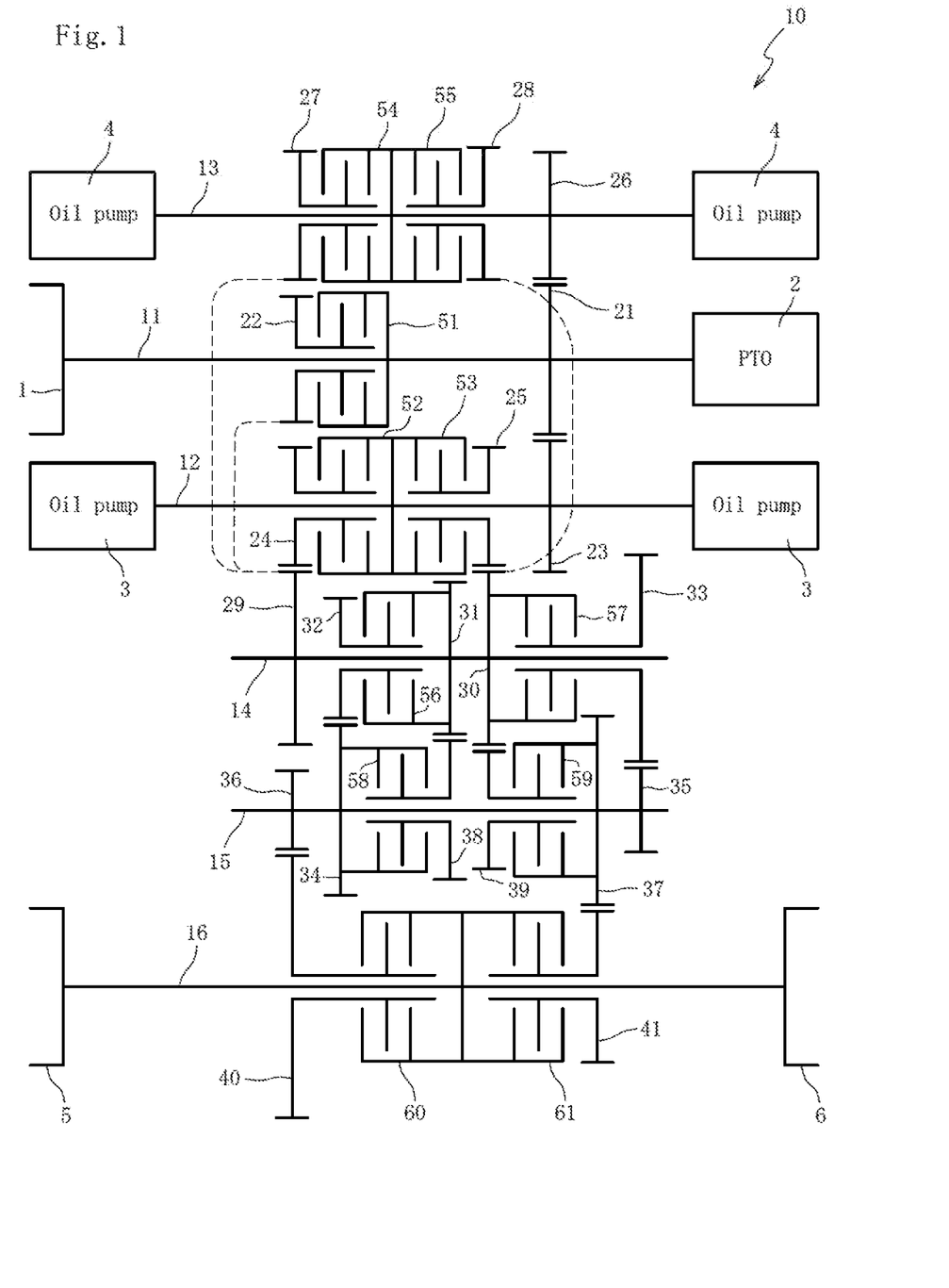
FIG. 1 is a skeleton diagram illustrating a transmission according to an embodiment of the present invention.

Preferred embodiments of the present invention will now be described with reference to the accompanying drawings. FIG. 1 is a skeleton diagram illustrating a transmission 10 according to an embodiment of the present invention. The transmission 10 is mounted in a tractor or other work machine (not depicted) such as an agricultural machine or a construction machine.

The transmission 10 includes a first shaft 11, a second shaft 12, a third shaft 13, a fourth shaft 14, a fifth shaft 15, and a sixth shaft 16. These shafts are disposed in parallel to each other. The first shaft 11 acts as an input shaft. The second shaft 12, the third shaft 13, the fourth shaft 14, and the fifth shaft 15 act as intermediate shafts. The sixth shaft 16 acts as an output shaft. Power of a driving source 1, such as an engine or a torque converter, is inputted to the first shaft 11. A PTO (Power take-off) 2 is disposed on the first shaft 11. Hydraulic pumps 3, 4 are respectively disposed on both ends of the second and third shafts 12, 13. The hydraulic pumps 3, 4 are hydraulic power sources for a hydraulic system (not depicted), for example, of clutches for connecting and disconnecting the individual shafts or a rotary or lifter of a work machine. The transmission 10 outputs power from a front output member 5 and a rear output member 6. The front output member 5 and the rear output member 6 are disposed on the sixth shaft 16.

A first gear 21 couples to the first shaft 11. The first shaft 11 rotatably supports a second gear 22 by using a bearing (not depicted). The second gear 22 couples to the first shaft 11 when a first clutch 51 is engaged, and idles around the first shaft 11 when the first clutch 51 is disengaged.

A third gear 23 couples to the second shaft 12. The second shaft 12 rotatably supports a fourth gear 24 and a fifth gear 25 by using bearings (not depicted). The third gear 23 meshes with the first gear 21. The fourth gear 24 couples to the second shaft 12 when a second clutch 52 is engaged, and idles around the second shaft 12 when the second clutch 52 is disengaged. The fifth gear 25 couples to the second shaft 12 when a third clutch 53 is engaged, and idles around the second shaft 12 when the third clutch 53 is disengaged.

A sixth gear 26 couples to the third shaft 13. The third shaft 13 rotatably supports a seventh gear 27 and a eighth gear 28 by using bearings (not depicted). The sixth gear 26 meshes with the first gear 21. The seventh gear 27 couples to the third shaft 13 when a fourth clutch 54 is engaged, and idles around the third shaft 13 when the fourth clutch 54 is disengaged. The eighth gear 28 couples to the third shaft 13 when a fifth clutch 55 is engaged, and idles around the third shaft 13 when the fifth clutch 55 is disengaged.

A ninth gear 29, a tenth gear 30, and an eleventh gear 31 couple to the fourth shaft 14. The fourth shaft 14 rotatably supports a twelfth gear 32 and a thirteenth gear 33 by using bearings (not depicted). The ninth gear 29 meshes with the second gear 22, the fourth gear 24, and the seventh gear 27. The tenth gear 30 meshes with the fifth gear 25 and the eighth gear 28. The twelfth gear 32 couples to the fourth shaft 14 when a sixth clutch 56 is engaged, and idles around the fourth shaft 14 when the sixth clutch 56 is disengaged. The thirteenth gear 33 couples to the fourth shaft 14 when a seventh clutch 57 is engaged, and idles around the fourth shaft 14 when the seventh clutch 57 is disengaged.

A fourteenth gear 34, a fifteenth gear 35, a sixteenth gear 36, and a seventeenth gear 37 couple to the fifth shaft 15. The fifth shaft 15 rotatably supports an eighteenth gear 38 and a nineteenth gear 39 by using bearings (not depicted). The fourteenth gear 34 meshes with the twelfth gear 32. The fifteenth gear 35 meshes with the thirteenth gear 33. The eighteenth gear 38 meshes with the eleventh gear 31. The nineteenth gear 39 meshes with the tenth gear 30. The eighteenth gear 38 couples to the fifth shaft 15 when an eighth clutch 58 is engaged, and idles around the fifth shaft 15 when the eighth clutch 58 is disengaged. The nineteenth gear 39 couples to the fifth shaft 15 when a ninth clutch 59 is engaged, and idles around the fifth shaft 15 when the ninth clutch 59 is disengaged.

The sixth shaft 16 rotatably supports a twentieth gear 40 and a twenty-first gear 41 by using bearings (not depicted). The twentieth gear 40 meshes with the sixteenth gear 36. The twenty-first gear 41 meshes with the seventeenth gear 37. The twentieth gear 40 couples to the sixth shaft 16 when a tenth clutch 60 is engaged, and idles around the sixth shaft 16 when the tenth clutch 60 is disengaged. The twenty-first gear 41 couples to the sixth shaft 16 when an eleventh clutch 61 is engaged, and idles around the sixth shaft 16 when the eleventh clutch 61 is disengaged. In the present embodiment, the first clutch 51 to eleventh clutch 61 are hydraulic friction clutches.

Figure 2:
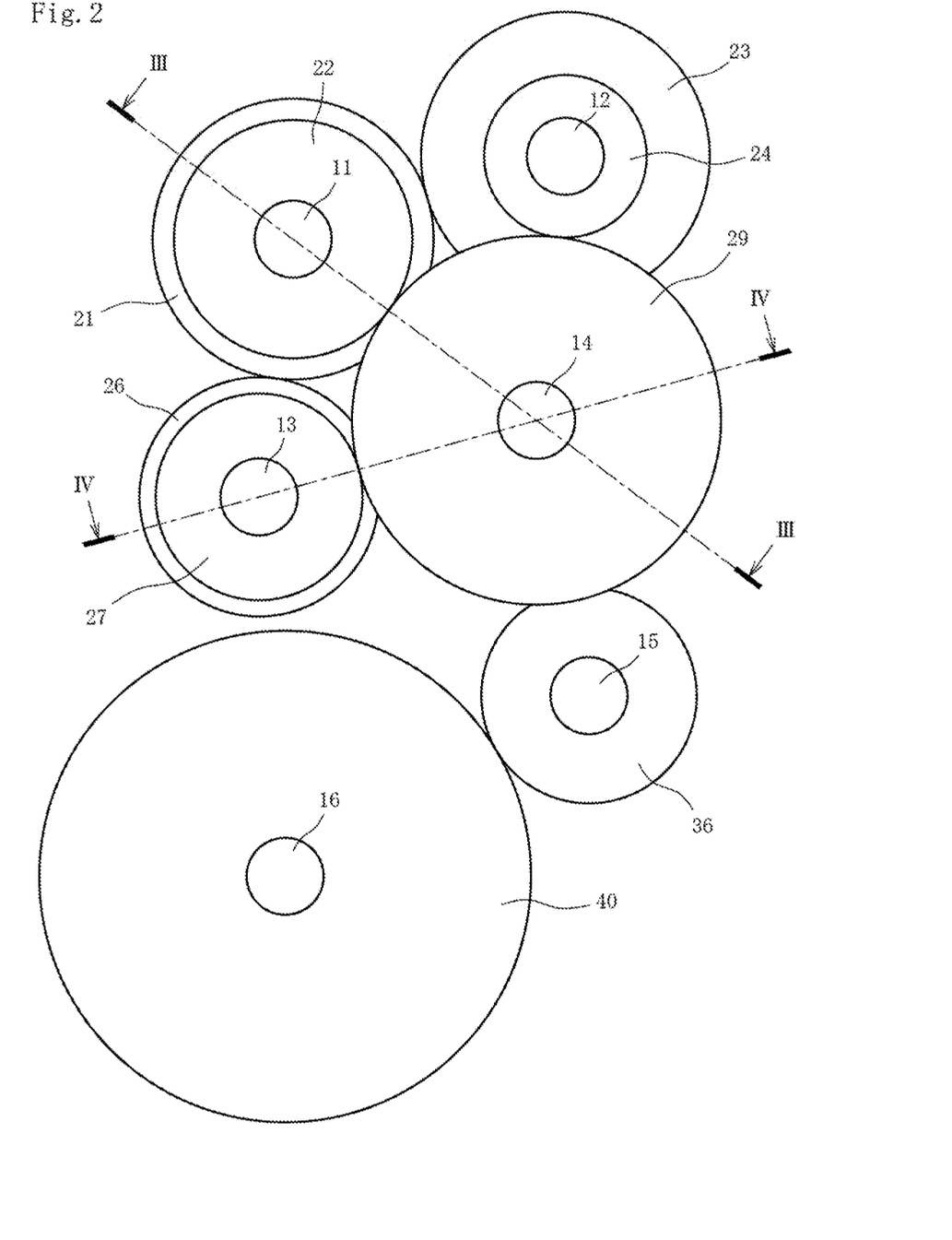
FIG. 2 is a schematic front view of the transmission.
Figure 3:
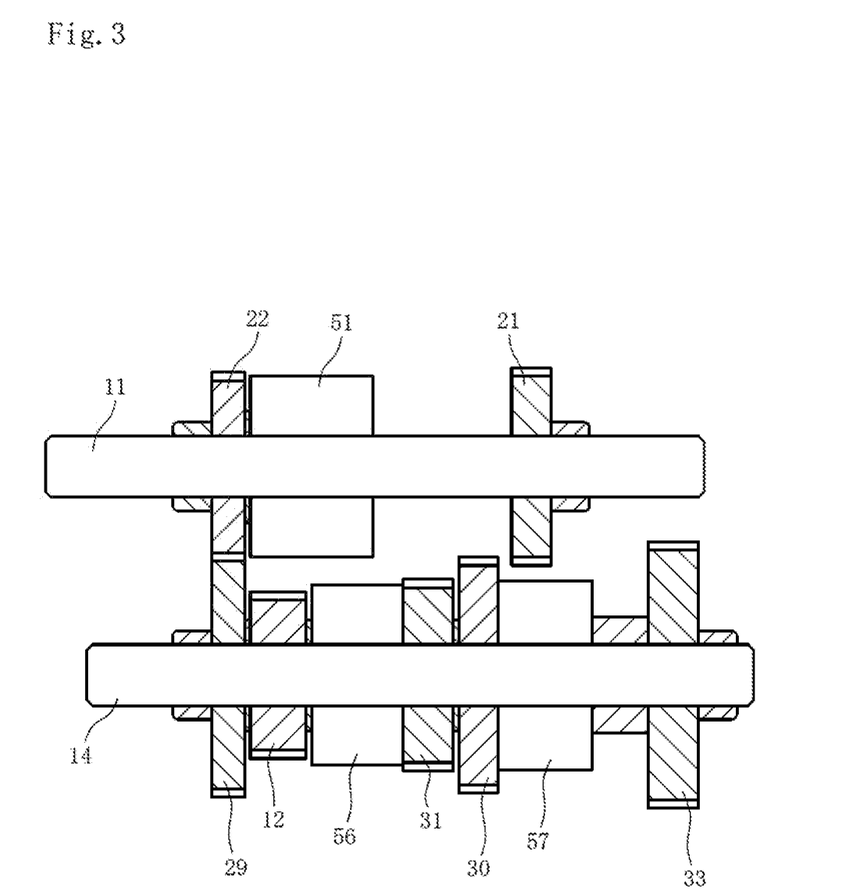
FIG. 3 is a cross-sectional view of the transmission taken along line III-III in FIG. 2.
Figure 4:
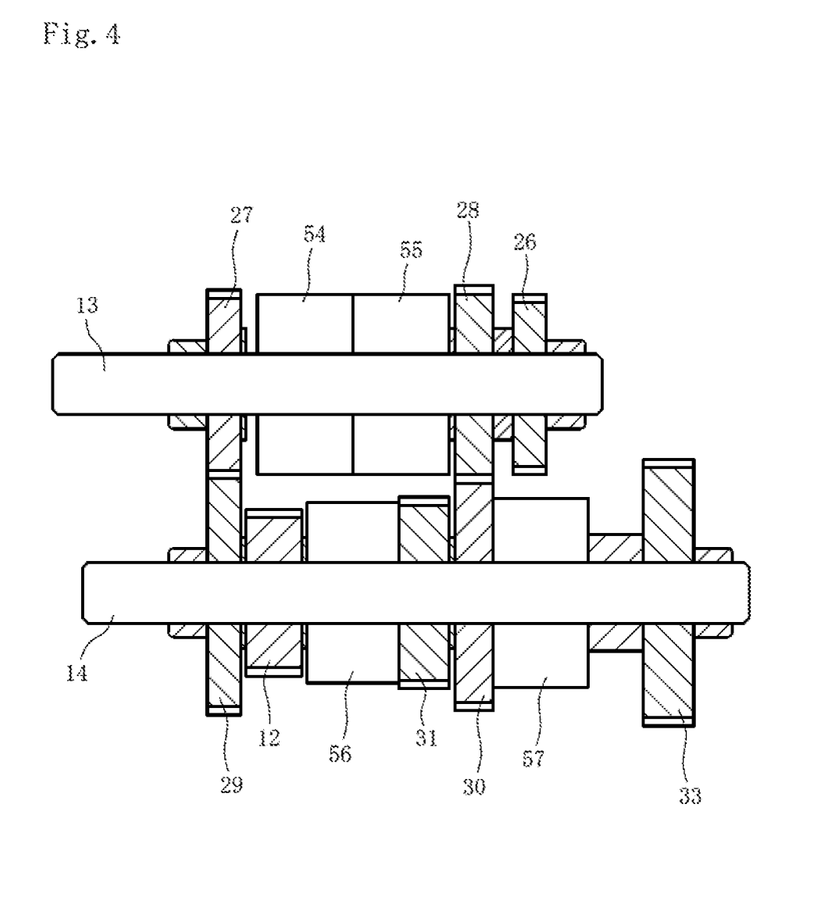
FIG. 4 is a cross-sectional view of the transmission taken along line IV-IV in FIG. 2.

FIG. 2 is a schematic front view of the transmission 10. FIG. 3 is a cross-sectional view of the transmission 10 taken along line III-III in FIG. 2. FIG. 4 is a cross-sectional view of the transmission taken along line IV-IV in FIG. 2. FIG. 2 does not depict the teeth of each gear. FIGS. 3 and 4 do not depict the interior of each of the clutches 51, 54, 55, 56 and 57.

As depicted in FIG. 2, the third gear 23 on the second shaft 12 and the sixth gear 26 on the third shaft 13 mesh with the first gear 21 on the first shaft 11 so that the power of the first shaft 11 is transmitted to the second shaft 12 and the third shaft 13. As power is transmitted to the fourth shaft 14 through the second gear 22 on the first shaft 11, the fourth gear 24 on the second shaft 12, and the seventh gear 27 on the third shaft 13, it is possible to suppress dimensions in the direction perpendicular to the first shaft 11 to the fourth shaft 14.

As depicted in FIGS. 3 and 4, the second gear 22 on the first shaft 11 and the seventh gear 27 on the third shaft 13 mesh with the ninth gear 29 on the fourth shaft 14. Therefore, the number of gears disposed on the fourth shaft 14 can be made smaller than in a case where gears in mesh with the second gear 22 and gears in mesh with the seventh gear 27 are both disposed on the fourth shaft 14. Further, as no more than two clutches are disposed on each shaft, it is possible to suppress dimensions in the direction perpendicular to and dimensions in the axial direction of the first shaft 11 to the fourth shaft 14. This makes it possible to save the space required for the transmission 10. As a result, the transmission 10 can easily be mounted in a work machine (not depicted).

Further description will now be given with reference again to FIG. 1. The transmission 10 is configured such that the clutches are disposed on all the shafts from the first shaft 11 to the sixth shaft 16. One clutch is disposed on the first shaft 11, and two clutches are disposed on each of the second shaft 12 to the sixth shaft 16. As no more than two clutches are disposed on each shaft, it is possible to suppress the lengths of the shafts on which the clutches are disposed.

Figure 5:
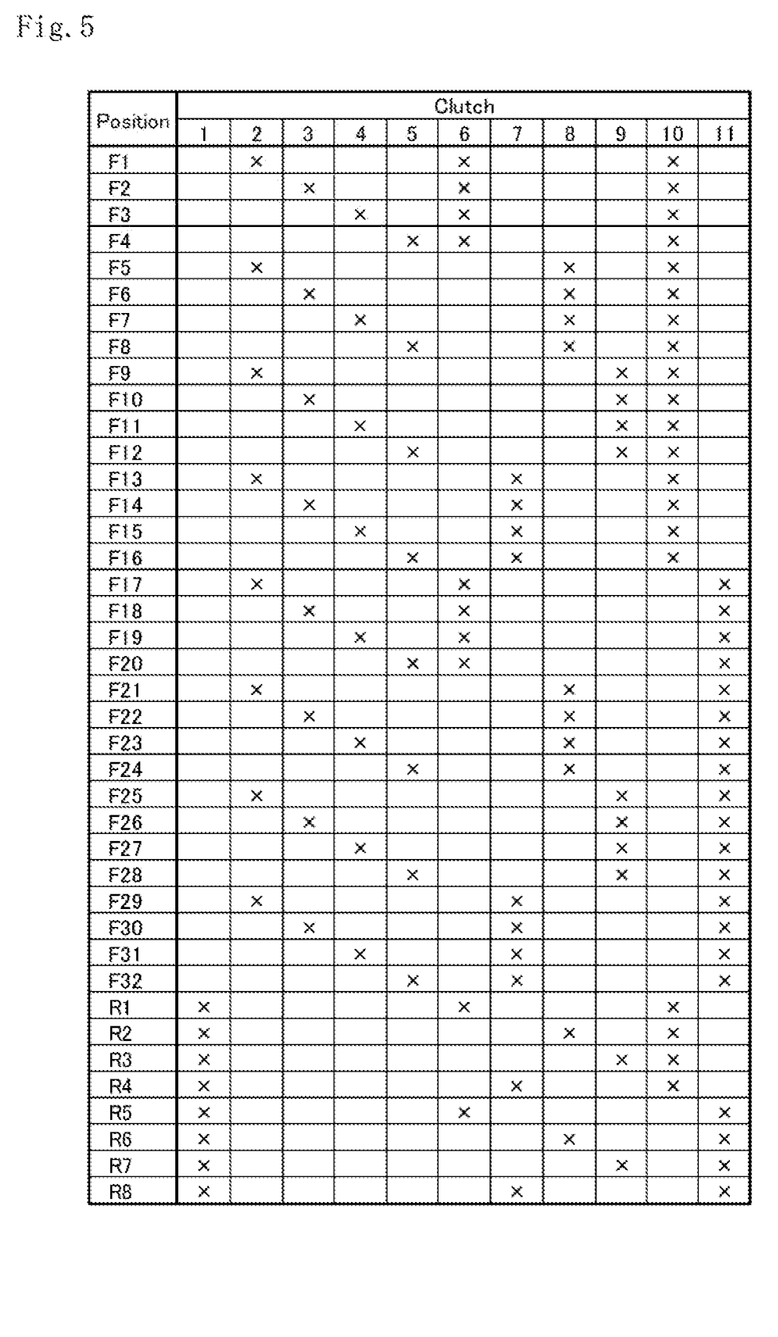
FIG. 5 is a chart illustrating clutch engagement combinations.

FIG. 5 is a chart illustrating clutch engagement combinations of the transmission 10. The transmission 10 is able to have thirty-two forward gear positions (F1 to F32) and eight reverse gear positions (R1 to R8) by shifting gears to switch the first clutch 51 to the eleventh clutch 61 (marked 1 to 11 in FIG. 5). The clutches to be engaged at each gear position are marked x in FIG. 5. Three clutches are simultaneously engaged at each gear position. The transmission 10 is able to select a predetermined gear ratio by performing an operation for switching the first clutch 51 to the eleventh clutch 61.

When shifting into neutral, the transmission 10 disengages the first clutch 51, the second clutch 52, the third clutch 53, the fourth clutch 54, and the fifth clutch 55. As a result, no power is transmitted to shafts other than the first shaft 11, the second shaft 12, and the third shaft 13. The third gear 23 coupling to the second shaft 12 and the sixth gear 26 coupling to the third shaft 13 mesh with the first gear 21 coupling to the first shaft 11. Therefore, when the first shaft 11 rotates, the second shaft 12 and the third shaft 13 always rotate. Consequently, the hydraulic pumps 3, 4 connected to both ends of the second and third shafts 12, 13 always operate when the first shaft 11 rotates.

When shifting into the first forward gear position (F1), the transmission 10 engages the second clutch 52, the sixth clutch 56, and the tenth clutch 60, and disengages the other clutches. The power of the first shaft 11 is transmitted to the sixth shaft 16 through eight gears in the order of the first gear 21, the third gear 23, the fourth gear 24, the ninth gear 29, the twelfth gear 32, the fourteenth gear 34, the sixteenth gear 36, and the twentieth gear 40.

When shifting into the second forward gear position (F2), the transmission 10 engages the third clutch 53, the sixth clutch 56, and the tenth clutch 60, and disengages the other clutches. The power of the first shaft 11 is transmitted to the sixth shaft 16 through eight gears in the order of the first gear 21, the third gear 23, the fifth gear 25, the tenth gear 30, the twelfth gear 32, the fourteenth gear 34, the sixteenth gear 36, and the twentieth gear 40.

When shifting into the third forward gear position (F3), the transmission 10 engages the fourth clutch 54, the sixth clutch 56, and the tenth clutch 60, and disengages the other clutches. The power of the first shaft 11 is transmitted to the sixth shaft 16 through eight gears in the order of the first gear 21, the sixth gear 26, the seventh gear 27, the ninth gear 29, the twelfth gear 32, the fourteenth gear 34, the sixteenth gear 36, and the twentieth gear 40.

When shifting into the fourth forward gear position (F4), the transmission 10 engages the fifth clutch 55, the sixth clutch 56, and the tenth clutch 60, and disengages the other clutches. The power of the first shaft 11 is transmitted to the sixth shaft 16 through eight gears in the order of the first gear 21, the sixth gear 26, the eighth gear 28, the tenth gear 30, the twelfth gear 32, the fourteenth gear 34, the sixteenth gear 36, and the twentieth gear 40.

When shifting into the fifth forward gear position (F5), the transmission 10 engages the second clutch 52, the eighth clutch 53, and the tenth clutch 60, and disengages the other clutches. The power of the first shaft 11 is transmitted to the sixth shaft 16 through eight gears in the order of the first gear 21, the third gear 23, the fourth gear 24, the ninth gear 29, the eleventh gear 31, the eighteenth gear 38, the sixteenth gear 36, and the twentieth gear 40.

When shifting into the sixth forward gear position (F6), the transmission 10 engages the third clutch 53, the eighth clutch 58, and the tenth clutch 60, and disengages the other clutches. The power of the first shaft 11 is transmitted to the sixth shaft 16 through eight gears in the order of the first gear 21, the third gear 23, the fifth gear 25, the tenth gear 30, the eleventh gear 31, the eighteenth gear 38, the sixteenth gear 36, and the twentieth gear 40.

When shifting into the seventh forward gear position (F7), the transmission 10 engages the fourth clutch 54, the eighth clutch 58, and the tenth clutch 60, and disengages the other clutches. The power of the first shaft 11 is transmitted to the sixth shaft 16 through eight gears in the order of the first gear 21, the sixth gear 26, the seventh gear 27, the ninth gear 29, the eleventh gear 31, the eighteenth gear 38, the sixteenth gear 36, and the twentieth gear 40.

When shifting into the eighth forward gear position (F8), the transmission 10 engages the fifth clutch 55, the eighth clutch 58, and the tenth clutch 60, and disengages the other clutches. The power of the first shaft 11 is transmitted to the sixth shaft 16 through eight gears in the order of the first gear 21, the sixth gear 26, the eighth gear 28, the tenth gear 30, the eleventh gear 31, the eighteenth gear 38, the sixteenth gear 36, and the twentieth gear 40.

When shifting into the ninth forward gear position (F9), the transmission 10 engages the second clutch 52, the ninth clutch 59, and the tenth clutch 60, and disengages the other clutches. The power of the first shaft 11 is transmitted to the sixth shaft 16 through eight gears in the order of the first gear 21, the third gear 23, the fourth gear 24, the ninth gear 29, the tenth gear 30, the nineteenth gear 39, the sixteenth gear 36, and the twentieth gear 40.

When shifting into the tenth forward gear position (F10), the transmission 10 engages the third clutch 53, the ninth clutch 59, and the tenth clutch 60, and disengages the other clutches. The power of the first shaft 11 is transmitted to the sixth shaft 16 through seven gears in the order of the first gear 21, the third gear 23, the fifth gear 25, the tenth gear 30, the nineteenth gear 39, the sixteenth gear 36, and the twentieth gear 40.

When shifting into the eleventh forward gear position (F11), the transmission 10 engages the fourth clutch 54, the ninth clutch 59, and the tenth clutch 60, and disengages the other clutches. The power of the first shaft 11 is transmitted to the sixth shaft 16 through eight gears in the order of the first gear 21, the sixth gear 26, the seventh gear 27, the ninth gear 29, the tenth gear 30, the nineteenth gear 39, the sixteenth gear 36, and the twentieth gear 40.

When shifting into the twelfth forward gear position (F12), the transmission 10 engages the fifth clutch 55, the ninth clutch 59, and the tenth clutch 60, and disengages the other clutches. The power of the first shaft 11 is transmitted to the sixth shaft 16 through seven gears in the order of the first gear 21, the sixth gear 26, the eighth gear 28, the tenth gear 30, the nineteenth gear 39, the sixteenth gear 36, and the twentieth gear 40.

When shifting into the thirteen forward gear position (F13), the transmission 10 engages the second clutch 52, the seventh clutch 57, and the tenth clutch 60, and disengages the other clutches. The power of the first shaft 11 is transmitted to the sixth shaft 16 through eight gears in the order of the first gear 21, the third gear 23, the fourth gear 24, the ninth gear 29, the thirteenth gear 33, the fifteenth gear 35, the sixteenth gear 36, and the twentieth gear 40.

When shifting into the fourteen forward gear position (F14), the transmission 10 engages the third clutch 53, the seventh clutch 57, and the tenth clutch 60, and disengages the other clutches. The power of the first shaft 11 is transmitted to the sixth shaft 16 through eight gears in the order of the first gear 21, the third gear 23, the fifth gear 25, the tenth gear 30, the thirteenth gear 33, the fifteenth gear 35, the sixteenth gear 36, and the twentieth gear 40.

When shifting into the fifteen forward gear position (F15), the transmission 10 engages the fourth clutch 54, the seventh clutch 57, and the tenth clutch 60, and disengages the other clutches. The power of the first shaft 11 is transmitted to the sixth shaft 16 through eight gears in the order of the first gear 21, the sixth gear 26, the seventh gear 27, the ninth gear 29, the thirteenth gear 33, the fifteenth gear 35, the sixteenth gear 36, and the twentieth gear 40.

When shifting into the sixteenth forward gear position (F16), the transmission 10 engages the fifth clutch 55, the seventh clutch 57, and the tenth clutch 60, and disengages the other clutches. The power of the first shaft 11 is transmitted to the sixth shaft 16 through eight gears in the order of the first gear 21, the sixth gear 26, the eighth gear 28, the tenth gear 30, the thirteenth gear 33, the fifteenth gear 35, the sixteenth gear 36, and the twentieth gear 40.

When shifting into the seventeenth forward gear position (F17), the transmission 10 engages the second clutch 52, the sixth clutch 56, and the eleventh clutch 61, and disengages the other clutches. The power of the first shaft 11 is transmitted to the sixth shaft 16 through eight gears in the order of the first gear 21, the third gear 23, the fourth gear 24, the ninth gear 29, the twelfth gear 32, the fourteenth gear 34, the seventeenth gear 37, and the twenty-first gear 41.

When shifting into the eighteenth forward gear position (F18), the transmission 10 engages the third clutch 53, the sixth clutch 56, and the eleventh clutch 61, and disengages the other clutches. The power of the first shaft 11 is transmitted to the sixth shaft 16 through eight gears in the order of the first gear 21, the third gear 23, the fifth gear 25, the tenth gear 30, the twelfth gear 32, the fourteenth gear 34, the seventeenth gear 37, and the twenty-first gear 41.

When shifting into the nineteenth forward gear position (F19), the transmission 10 engages the fourth clutch 54, the sixth clutch 56, and the eleventh clutch 61, and disengages the other clutches. The power of the first shaft 11 is transmitted to the sixth shaft 16 through eight gears in the order of the first gear 21, the sixth gear 26, the seventh gear 27, the ninth gear 29, the twelfth gear 32, the fourteenth gear 34, the seventeenth gear 37, and the twenty-first gear 41.

When shifting into the twentieth forward gear position (F20), the transmission 10 engages the fifth clutch 55, the sixth clutch 56, and the eleventh clutch 61, and disengages the other clutches. The power of the first shaft 11 is transmitted to the sixth shaft 16 through eight gears in the order of the first gear 21, the sixth gear 26, the eighth gear 28, the tenth gear 30, the twelfth gear 32, the fourteenth gear 34, the seventeenth gear 37, and the twenty-first gear 41.

When shifting into the twenty-first forward gear position (F21), the transmission 10 engages the second clutch 52, the eighth clutch 58, and the eleventh clutch 61, and disengages the other clutches. The power of the first shaft 11 is transmitted to the sixth shaft 16 through eight gears in the order of the first gear 21, the third gear 23, the fourth gear 24, the ninth gear 29, the eleventh gear 31, the eighteenth gear 38, the seventeenth gear 37, and the twenty-first gear 41.

When shifting into the twenty-second forward gear position (F22), the transmission 10 engages the third clutch 53, the eighth clutch 58, and the eleventh clutch 61, and disengages the other clutches. The power of the first shaft 11 is transmitted to the sixth shaft 16 through eight gears in the order of the first gear 21, the third gear 23, the fifth gear 25, the tenth gear 30, the eleventh gear 31, the eighteenth gear 38, the seventeenth gear 37, and the twenty-first gear 41.

When shifting into the twenty-third forward gear position (F23), the transmission 10 engages the fourth clutch 54, the eighth clutch 58, and the eleventh clutch 61, and disengages the other clutches. The power of the first shaft 11 is transmitted to the sixth shaft 16 through eight gears in the order of the first gear 21, the sixth gear 26, the seventh gear 27, the ninth gear 29, the eleventh gear 31, the eighteenth gear 38, the seventeenth gear 37, and the twenty-first gear 41.

When shifting into the twenty-fourth forward gear position (F24), the transmission 10 engages the fifth clutch 55, the eighth clutch 58, and the eleventh clutch 61, and disengages the other clutches. The power of the first shaft 11 is transmitted to the sixth shaft 16 through eight gears in the order of the first gear 21, the sixth gear 26, the eighth gear 28, the tenth gear 30, the eleventh gear 31, the eighteenth gear 38, the seventeenth gear 37, and the twenty-first gear 41.

When shifting into the twenty-fifth forward gear position (F25), the transmission 10 engages the second clutch 52, the ninth clutch 59, and the eleventh clutch 61, and disengages the other clutches. The power of the first shaft 11 is transmitted to the sixth shaft 16 through eight gears in the order of the first gear 21, the third gear 23, the fourth gear 24, the ninth gear 29, the tenth gear 30, the nineteenth gear 39, the seventeenth gear 37, and the twenty-first gear 41.

When shifting into the twenty-sixth forward gear position (F26), the transmission 10 engages the third clutch 53, the ninth clutch 59, and the eleventh clutch 61, and disengages the other clutches. The power of the first shaft 11 is transmitted to the sixth shaft 16 through seven gears in the order of the first gear 21, the third gear 23, the fifth gear 25, the tenth gear 30, the nineteenth gear 39, the seventeenth gear 37, and the twenty-first gear 41.

When shifting into the twenty-seventh forward gear position (F27), the transmission 10 engages the fourth clutch 54, the ninth clutch 59, and the eleventh clutch 61, and disengages the other clutches. The power of the first shaft 11 is transmitted to the sixth shaft 16 through eight gears in the order of the first gear 21, the sixth gear 26, the seventh gear 27, the ninth gear 29, the tenth gear 30, the nineteenth gear 39, the seventeenth gear 37, and the twenty-first gear 41.

When shifting into the twenty-eighth forward gear position (F28), the transmission 10 engages the fifth clutch 55, the ninth clutch 59, and the eleventh clutch 61, and disengages the other clutches. The power of the first shaft 11 is transmitted to the sixth shaft 16 through seven gears in the order of the first gear 21, the sixth gear 26, the eighth gear 28, the tenth gear 30, the nineteenth gear 39, the seventeenth gear 37, and the twenty-first gear 41.

When shifting into the twenty-ninth forward gear position (F29), the transmission 10 engages the second clutch 52, the seventh clutch 57, and the eleventh clutch 61, and disengages the other clutches. The power of the first shaft 11 is transmitted to the sixth shaft 16 through eight gears in the order of the first gear 21, the third gear 23, the fourth gear 24, the ninth gear 29, the thirteenth gear 33, the fifteenth gear 35, the seventeenth gear 37 and the twenty-first gear 41.

When shifting into the thirtieth forward gear position (F30), the transmission 10 engages the third clutch 53, the seventh clutch 57, and the eleventh clutch 61, and disengages the other clutches. The power of the first shaft 11 is transmitted to the sixth shaft 16 through eight gears in the order of the first gear 21, the third gear 23, the fifth gear 25, the tenth gear 30, the thirteenth gear 33, the fifteenth gear 35, the seventeenth gear 37 and the twenty-first gear 41.

When shifting into the thirty-first forward gear position (F31), the transmission 10 engages the fourth clutch 54, the seventh clutch 57, and the eleventh clutch 61, and disengages the other clutches. The power of the first shaft 11 is transmitted to the sixth shaft 16 through eight gears in the order of the first gear 21, the sixth gear 26, the seventh gear 27, the ninth gear 29, the thirteenth gear 33, the fifteenth gear 35, the seventeenth gear 37 and the twenty-first gear 41.

When shifting into the thirty-second forward gear position (F32), the transmission 10 engages the fifth clutch 55, the seventh clutch 57, and the eleventh clutch 61, and disengages the other clutches. The power of the first shaft 11 is transmitted to the sixth shaft 16 through eight gears in the order of the first gear 21, the sixth gear 26, the eighth gear 28, the tenth gear 30, the thirteenth gear 33, the fifteenth gear 35, the seventeenth gear 37 and the twenty-first gear 41.

When shifting into the first reverse gear position (R1), the transmission 10 engages the first clutch 51, the sixth clutch 56, and the tenth clutch 60, and disengages the other clutches. The power of the first shaft 11 is transmitted to the sixth shaft 16 through six gears in the order of the second gear 22, the ninth gear 29, the twelfth gear 32, the fourteenth gear 34, the sixteenth gear 36, and the twentieth gear 40.

When shifting into the second reverse gear position (R2), the transmission 10 engages the first clutch 51, the eighth clutch 53, and the tenth clutch 60, and disengages the other clutches. The power of the first shaft 11 is transmitted to the sixth shaft 16 through six gears in the order of the second gear 22, the ninth gear 29, the eleventh gear 31, the eighteenth gear 38, the sixteenth gear 36, and the twentieth gear 40.

When shifting into the third reverse gear position (R3), the transmission 10 engages the first clutch 51, the ninth clutch 59, and the tenth clutch 60, and disengages the other clutches. The power of the first shaft 11 is transmitted to the sixth shaft 16 through six gears in the order of the second gear 22, the ninth gear 29, the tenth gear 30, the nineteenth gear 39, the sixteenth gear 36, and the twentieth gear 40.

When shifting into the fourth reverse gear position (R4), the transmission 10 engages the first clutch 51, the seventh clutch 57, and the tenth clutch 60, and disengages the other clutches. The power of the first shaft 11 is transmitted to the sixth shaft 16 through six gears in the order of the second gear 22, the ninth gear 29, the thirteenth gear 33, the fifteenth gear 35, the sixteenth gear 36, and the twentieth gear 40.

When shifting into the fifth reverse gear position (R5), the transmission 10 engages the first clutch 51, the sixth clutch 56, and the eleventh clutch 61, and disengages the other clutches. The power of the first shaft 11 is transmitted to the sixth shaft 16 through six gears in the order of the second gear 22, the ninth gear 29, the twelfth gear 32, the fourteenth gear 34, the seventeenth gear 37, and the twenty-first gear 41.

When shifting into the sixth reverse gear position (R6), the transmission 10 engages the first clutch 51, the eighth clutch 58, and the eleventh clutch 61, and disengages the other clutches. The power of the first shaft 11 is transmitted to the sixth shaft 16 through six gears in the order of the second gear 22, the ninth gear 29, the eleventh gear 31, the eighteenth gear 38, the seventeenth gear 37, and the twenty-first, gear 41.

When shifting into the seventh reverse gear position (R7), the transmission 10 engages the first clutch 51, the ninth clutch 59, and the eleventh clutch 61, and disengages the other clutches. The power of the first shaft 11 is transmitted to the sixth shaft 16 through six gears in the order of the second gear 22, the ninth gear 29, the tenth gear 30, the nineteenth gear 39, the seventeenth gear 37, and the twenty-first gear 41.

When shifting into the eighth reverse gear position (R8), the transmission 10 engages the first clutch 51, the seventh clutch 57, and the eleventh clutch 61, and disengages the other clutches. The power of the first shaft 11 is transmitted to the sixth shaft 16 through six gears in the order of the second gear 22, the ninth gear 29, the thirteenth gear 33, the fifteenth gear 35, the seventeenth gear 37, and the twenty-first gear 41.

At an agricultural land or other work place, the transmission 10 mainly uses low to intermediate gear positions under normal conditions. When moving a vehicle to a work place, the transmission 10 mainly uses a high gear position. As the transmission 10 is able to obtain many different gear positions, an optimum gear ratio can be selected both for moving a vehicle and for performing work. The transmission 10 transmits the torque of the first shaft 11 to the sixth shaft 16 through a maximum of only eight gears. This makes it possible to reduce the loss caused by gear meshing.

At any gear position, the transmission 10 applies torque to the twentieth gear 40 or twenty-first gear 41 on the sixth shaft 16. Therefore, as compared with a case where torque is applied to a plurality of gears on the sixth shaft 16, it is possible to reduce the lead on a bearing (not depicted) supporting a gear on the sixth shaft 16, which provides high torque. Consequently, as compared with the case where torque is applied to the plurality of gears on the sixth shaft 16, it is possible to prolong the life of the bearing supporting a gear on the sixth shaft 16.

As the hydraulic pumps 3, 4 are respectively connected to both ends of the second and third shafts 12, 13, it is possible to drive the many hydraulic pumps 3, 4 (four hydraulic pumps in the present embodiment). It should be noted that the number of hydraulic pumps 3, 4 to be connected to the second and third shafts 12, 13 can be set within a range of one to four hydraulic pumps.

The present invention has been described in terms of an embodiment. However, the present invention is not limited to the above-described embodiment. It will be easily understood by those skilled in the art that various improvements and modifications may be made without departing from the sprit and scope of the present invention.

The foregoing embodiment has been described with reference to the thirty-two forward gear positions and eight reverse gear positions of the transmission 10. However, such gear positions are merely illustrative, and the present invention is not limited to such gear positions. Obviously, in consideration of step ratio and operability, some of such gear positions may be omitted from the transmission 10 (e.g., the forward gear positions F17 to F19 may be omitted from FIG. 5 to provide twenty-nine forward gear positions and eight reverse gear positions).

The foregoing embodiment has been described with reference to a case where power is outputted from the front output member 5 and rear output member 6 disposed on the sixth shaft 16. However, the present invention is not limited to such a configuration. Obviously, the sixth shaft 16 may be omitted so as to dispose the front output member 5 and the rear output member 6 on the fifth shaft 15. Further, it is obvious that the fifth shaft 15 and the sixth shaft 16 may be omitted so as to dispose the front output member 5 and the rear output member 6 on the fourth shaft 14.

The foregoing embodiment has been described with reference to a case where the hydraulic friction clutches are engaged to couple the gears to the shafts. However, the present invention is not limited to such a configuration. Obviously, dog clutches or other jaw clutches may be adopted instead of the friction clutches. Further, it is obvious that non-hydraulic clutches may be adopted instead of the hydraulic clutches. It is also obvious that synchronizers may be disposed. When the non-hydraulic clutches are adopted to decrease the number of hydraulic clutches, it is possible to reduce drag resistance unique to hydraulic clutches.

DESCRIPTION OF REFERENCE NUMERALS 3, 4: hydraulic pump
10: transmission
11: first shaft, 12: second shaft, 13: third shaft, 14: forth shaft, 15: fifth shaft
21: first gear, 22: second gear, 23: third gear, 24: forth gear, 25: fifth gear, 26: sixth gear, 27: seventh gear, 28: eighth gear,
29: ninth gear, 30: tenth gear, 31: eleventh gear, 32: twelfth gear, 34: fourteenth gear, 38: eighteenth gear
51: first clutch, 52: second clutch, 54: fourth clutch, 56: sixth clutch

The invention claimed is:

1. A transmission at least comprising:
a first shaft;
a second shaft;
a third shaft; and
a fourth shaft;
wherein the first, second, third, and fourth shafts are parallel to each other;
wherein the first shaft includes a first gear and a second gear, the first gear coupling to the first shaft, the second gear coupling to or idling around the first shaft when a first clutch is switched;
wherein the second shaft includes a third gear and a fourth gear, the third gear meshing with the first gear and coupling to the second shaft, the fourth gear coupling to or idling around the second shaft when a second clutch is switched;
wherein the third shaft includes a sixth gear and a seventh gear, the sixth gear meshing with the first gear and coupling to the third shaft, the seventh gear coupling to or idling around the third shaft when a fourth clutch is switched;
wherein the fourth shaft includes a ninth gear, the ninth gear meshing with the second gear, the fourth gear, and the seventh gear, and coupling to the fourth shaft, and
wherein the first shaft acts as an input shaft receiving power from a drive source, the first shaft transmitting the power to the second shaft and to the third shaft via the first gear, the third gear and the sixth gear.

2. The transmission according to claim 1,
wherein the second shaft includes a fifth gear that couples to or idles around the second shaft when a third clutch is switched,
wherein the third shaft includes an eighth gear that couples to or idles around the third shaft when a fifth clutch is switched, and
wherein the fourth shaft includes a tenth gear that meshes with the fifth gear and the eighth gear and couples to the fourth shaft.

3. The transmission according to claim 1,
further comprising:
a fifth shaft that is parallel to the fourth shaft;
wherein the fourth shaft includes an eleventh gear and a twelfth gear, the eleventh gear coupling to the fourth shaft, the twelfth gear coupling to or idling around the fourth shaft when a sixth clutch is switched; and
wherein the fifth shaft includes a fourteenth gear and an eighteenth gear, the fourteenth gear meshing with the twelfth gear and coupling to the fifth shaft, the eighteenth gear meshing with the eleventh gear, and coupling to or idling around the fifth shaft when an eighth clutch is switched.

4. The transmission according to claim 1, further comprising:
hydraulic pumps that are respectively driven by the second shaft and the third shaft.

* * * * *